United States Patent
Cohen

[11] 3,800,921
[45] *Apr. 2, 1974

[54] DASHPOT ASSEMBLY WITH SHEATH HAVING BUILT-IN VALVE

[75] Inventor: Arthur M. Cohen, Westport, Conn.

[73] Assignee: Airpot Corporation, Norwalk, Conn.

[ * ] Notice: The portion of the term of this patent subsequent to Feb. 1, 1989, has been disclaimed.

[22] Filed: Jan. 28, 1972

[21] Appl. No.: 221,540

[52] U.S. Cl.................. 188/298, 188/322, 251/121
[51] Int. Cl............................................... F16f 9/44
[58] Field of Search .......... 188/266, 270, 300, 297, 188/301, 322, 295, 298, 311; 251/120, 121, 205

[56]  References Cited
UNITED STATES PATENTS

| | | | |
|---|---|---|---|
| 3,638,769 | 2/1972 | Cohen................................ | 188/298 |
| 2,361,739 | 10/1944 | Bobst.................................. | 188/295 |
| 2,392,449 | 1/1946 | Austin................................. | 188/297 |
| 2,506,225 | 5/1950 | Kuhn et al. ....................... | 188/298 X |
| 3,286,797 | 11/1966 | Leibfritz et al. .................... | 188/300 |
| 3,365,166 | 1/1968 | Smith................................. | 251/121 |

FOREIGN PATENTS OR APPLICATIONS

| | | | |
|---|---|---|---|
| 767,649 | 2/1953 | Germany ............................ | 251/120 |
| 359,942 | 3/1962 | Switzerland......................... | 251/121 |

*Primary Examiner*—George E. A. Halvosa

[57]  ABSTRACT

The cylinder of a dashpot is formed from an accurately dimensioned rigid tube which is received within a soft plastic sheath, the latter surrounding the side walls of the tube and also closing the end of that tube. Integrally formed in the sheath is a specially constructed adjustable valve by means of which the damping action of the dashpot can be controlled. The movable portion of that valve is preferably formed of the same material as the sheath and is received within the sheath with an interference fit, whereby the siding of the valve is substantially insensitive to vibration and to temperature variations. The sheath may overlie the cylinder tube, thereby positively to retain it in position, and may also extend over the open top of the tube, thereby to prevent accidental withdrawal of the piston from the cylinder.

24 Claims, 16 Drawing Figures

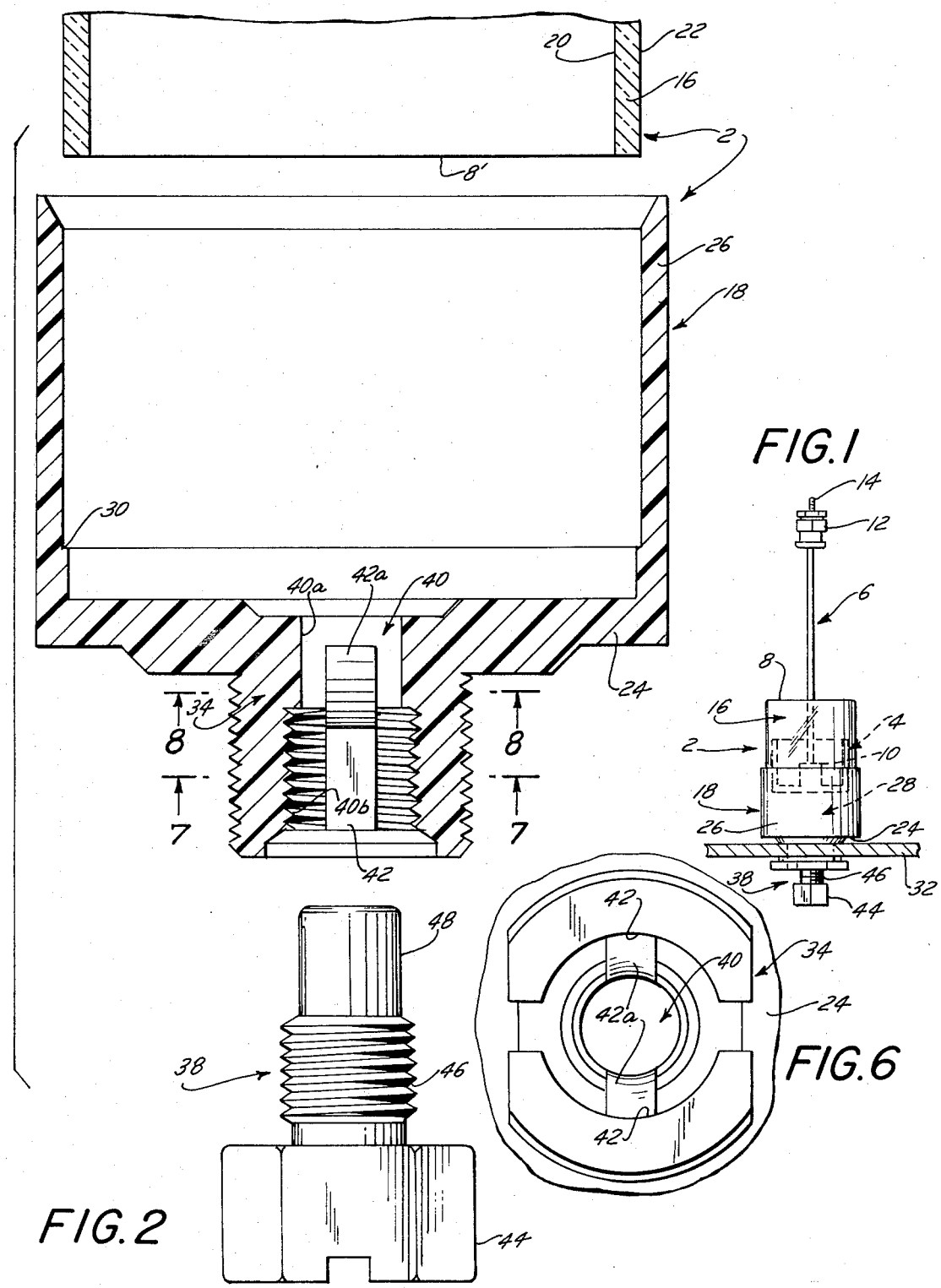

DASHPOT ASSEMBLY WITH SHEATH HAVING BUILT-IN VALVE

The present invention relates to a dashpot assembly and in particular to the mounting of the cylinder portion thereof within a surrounding sheath, an adjusting valve for the dashpot being formed integrally with the sheath.

Dashpots generally comprise a cylinder within which a piston is slidable, the dashpot action being provided by the compression or expansion of the air in the chamber defined between the piston and cylinder. A valve is provided to control the flow of air either into or out of that chamber, thereby to vary the dashpot action, permit the piston to move more readily in one direction or the other, or both. In order for the dashpot action to be effective and to be accurately controllable it is essential that the piston fit into the cylinder in an airtight fashion while still being slidable therethrough. This presents great problems, particularly where the dashpot is to be subjected to varying temperatures. Both the piston and the cylinder can be made of the same substance, usually a metal, in which case they will both tend to expand and contract at the same rate with changes in temperature, but if this approach to the problem is taken the inner surface of the cylinder and the outer surface of the piston must both be machined with great accuracy, and this is quite expensive.

An inexpensive type of dashpot which nevertheless is exceptionally accurate is of the type shown in May U.S. Pat. No. 3,005,523 of Oct. 24, 1961 entitled "Damping Dashpot." That dashpot comprises a cylinder which is formed of glass tubing within which a piston slides, the piston being formed of compressed powdered graphite. With this combination, it has been found, a very precise sealing yet sliding fit is achieved between the piston and the cylinder at exceptionally low cost, while the temperature coefficients of expansion of the piston and cylinder are sufficiently close to one another so that the dashpot can be subjected to wide variations in temperature without deleterious effects.

In such a dashpot the piston rod extends from one end of the tube. The other end of the tube must be closed. To that end, and as shown in U.S. Pat. No. 3,005,423, the glass tube is mounted in a base plate formed of some suitable structural material. A seal must be produced between the cylinder tube and that end plate, and that seal must be capable of withstanding wide variations in temperature. It therefore is necessary to use for the base plate a material which must be rather precisely dimensioned and which has closely the same temperature expansion characteristic as the glass tube. These criteria have in the past been met only approximately, and even then only through the use of comparatively expensive materials.

Two other problems are presented by the prior art dashpot structure exemplified by U.S. Pat. No. 3,005,523. In the first place, since the cylinder is formed of glass it is essentially fragile. Hence it must be protected in shipment and during assembly and must be used in an environment in which it is not liable to receive external blows or severe shocks. In the second place, mounting of the dashpot on an appropriate supporting structure, such as a panel, while not insuperable by any means, is nevertheless somewhat troublesome. Screws or the like must be employed to attach the end plate to the mounting structure. If those screws are located within the confines of an extension of the cylinder they will weaken the cylinder end wall; if they are disposed outside those confines they require more area for the mounting of the dashpot than the dashpot proper takes up. The fact that screws are used for attachment means that an appreciable time is involved in removing a defective dashpot from an installation and replacing it with a new one, particularly where the dashpot is located in a relatively inaccessible position where it is hard to get to and manipulate its mounting screws.

In my copending application Ser. No. 857697, filed Sept. 15, 1969, now U.S. Pat. No. 3,638,769 and entitled "Dashpot Assembly" I have disclosed a construction in which the cylinder is received within an integral soft, stretchable sheath, that sheath comprising a cylindrical portion snugly fitting around the tube and an end wall closing an end of the tube, the end wall haveing a portion extending therefrom by means of which the assembly can be mounted on a panelboard or the like. This construction has solved the problems set forth above very satisfactorily. There is, however, another problem involved with dashpots of the type under discussion, and that is providing means for accurately adjusting the dashpot action, which means will be effective, when once adjusted, to be highly resistant to vibration and shock and to provide non-varying dashpot action over a wide range of temperatures to which the assembly may be subjected. Control of dashpot action is usually achieved by interposing an adjustable valve in a fluid flow path between the interior of the dashpot cylinder and the exterior of the assembly, that valve throttling fluid flow therethrough in accordance with its setting and thus controlling the fluid resistance exerted against the piston when the latter moves in a given direction. Adjustable valves are, of course, quite old in the art, but precision adjustable valves capable of functioning with a dashpot of the type under discussion and providing the desired degree of precision and reliability of control constitute an appreciable source of expense. This is particularly true in connection with dashpots of the type hereunder discussion the disclosed elements of which are relatively inexpensive despite their high degree of precision.

As has been mentioned, vibration is a problem in assemblies of the type under discussion. The adjustable element of the valve, when once set, must remain in its set position even though the assembly is subjected to severe conditions of vibration or shock. It is not easy to accomplish this even in a complicated valve structure, except by making the valve very difficult to adjust in the first place, and that is undesirable. Another problem, particularly where the dashpot assemblies may be used in environments where the ambient temperature may vary widely, is maintaining the throttling effect of the valve constant despite such wide variations in temperature. This latter result can be accomplished by utilizing the same material for the valve body and the adjustable element, so that their respective expansions and contractions with temperature will compensate one another.

The prime object of the present invention is to devise a dashpot assembly in which an adjustable valve of improved accuracy and reliability is provided.

Another object of the present invention is to form an adjusting valve integral with a resilient sheath which surrounds the cylinder wall of the dashpot.

A further object of the present invention is to provide a dashpot assembly comprising of a rigid wall and a flexible sheath closing the bottom of the dashpot, in which the sheath not only protects the dashpot cylinder and also serves to mount the dashpot assembly, but in addition constitutes a valve for controlling the dashpot action, and, where desired, prevents the piston from being accidentally pulled out from the cylinder.

Yet another object of the present invention is to provide a precision adjustable valve of improved construction for use in conjunction with the dashpot.

In accordance with the present invention, the sheath itself, and in particular the wall thereof which closes off the bottom of the dashpot cylinder, is employed to form the stationary part of the adjustment valve, and the movable part of that valve, which may be constructed of the same material as the sheath, is provided with an interference fit relative to the sheath proper within which it is received. When this is done, and with proper design of the parts, a very efficient and effective adjustable valve is produced. Because of the compressible nature of the material of which the assembly, and preferably also the adjustable valve part, is formed, that adjustable part, when once positioned, is reliably retained in its adjusted position against the action of vibration and shock. Because the sheath and the valve part are formed of material having the same or substantially the same temperature coefficient of expansion, the valve setting is substantially insensitive to variations in ambient temperature. The parts may be very inexpensively formed and assembly of them is simple in the extreme.

The assembly has further been improved by so constructing the sheath that it overlaps the upper end of the glass cylinder, thereby positively retaining the cylinder in position within the sheath, and, when desired, the overlapping portion of the sheath may extend partially over the open top of the cylinder, thereby positively to prevent the piston from coming out from the cylinder. This action is particularly advantageous in connection with the use of the dashpots as snubbers or in other applications where the force tending to pull the piston out of the dashpot may be rather large.

To the accomplishment of the above, and to such other objects as may hereinafter appear, the present invention relates to the construction of a dashpot assembly as described in this specification, and as disclosed in the accompanying drawings, in which:

FIG. 1. is a side elevational view of the first embodiment of a dashpot assembly of my invention, the dashpot assembly being illustrated mounted in position on a panelboard shown in cross section;

FIG. 2. is a vertical cross sectional exploded view on an enlarged scale of the dashpot assembly of FIG. 1;

FIGS. 3, 4 and 5 are fragmentary cross sectional views showing the adjustable valve element in different positions relative to the stationary valve element;

FIG. 6. is a bottom plan view of the central portion of the sheath which carries the valve structure;

FIGS. 7 and 8 are cross sectional views taken respectively along the lines 7—7 and 8—8 of FIG. 1;

Figures 3, 4:
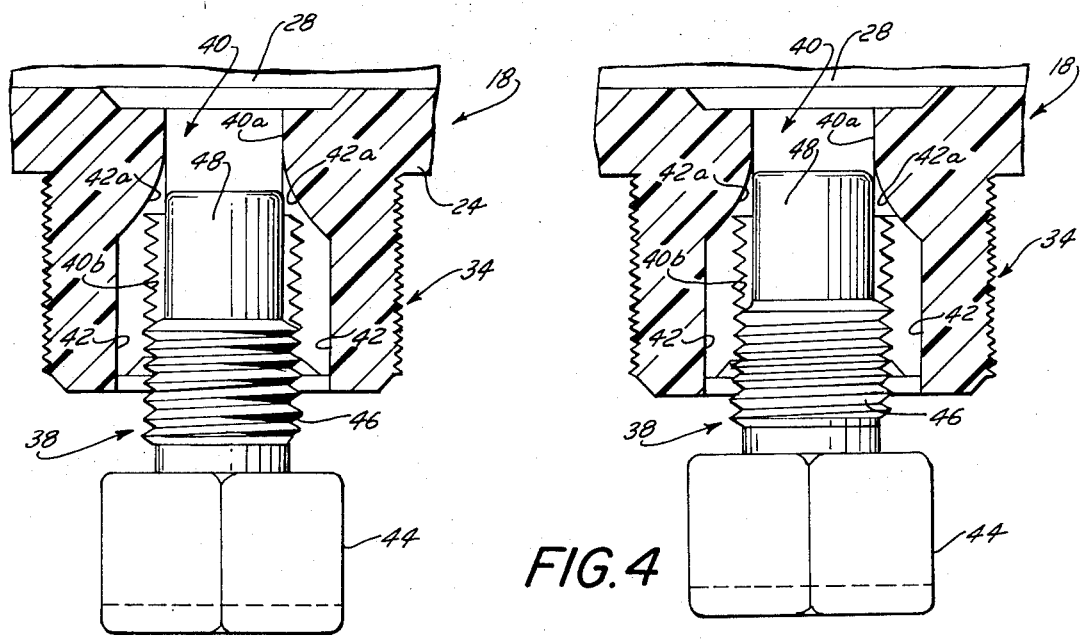

In the embodiment of FIGS. 1–8, in general conforming to the assembly construction of my prior application Ser. No. 857697, the dashpot comprises a cylinder assembly generally designated 2 in which a piston generally designated 4 is sealingly slidable, the piston being connected to a piston rod generally designated 6 which extends out through the upper open end of 8 of the cylinder 2.

As here specifically disclosed the connection 10 between the piston 4 and the piston rod 6 may be of the one-way valve type disclosed in Wilcox U.S. Pat. No. 3,175,646 of Mar. 30, 1965, entitled "Joint for Piston-Piston Rod Combination, and Valve Function Thereof," the connection 10 in one embodiment providing for valve closing when the piston rod 6 is pushed down and for valve opening when the piston rod 6 is pulled up. The upper end of the piston rod 6 may be connected by a ball and socket joint 12 to any appropriate actuating member 14. The piston 4 may be formed of any appropriate material; compressed powdered graphite is preferred.

The cylinder 2 is formed of two parts, a cylinder tube 16 and an outer part generally designated 18. The cylinder tube 16 is preferably formed of glass the inner surface 20 of which is very accurately dimensioned to fit the outer dimension of the piston 4, thereby to render the latter sealingly slidable in the former. For the same reason, the inner surface 20 of the tube 16 is smoothly polished. The surface characteristics and accuracy of dimension of the outer surface 22 of the tube 16 are not critical.

The outer part 18 is formed of a suitable soft plastic material, preferably stretchable and elastomeric in nature. Rubber, natural or artificial, is excellently suitable for use in that connection. That outer member comprises an end wall portion 24 from which a cylindrical portion 26 extends upwardly, the normal inner diameter of the upwardly extending cylinder portion 26 preferably being slightly less than the diameter of the outer surface 22 of the tube 16. The tube 16 is slid into the open upper end of the cylinder portion 26 so that the latter stretches and grips the outer surface of the former, thereby forming a seal between the two. When this has been done the end wall portion 24 effectively closes the bottom end 8' of the tube 16, thereby defining a chamber 28 between the piston 4 and the inside of the cylinder 2, the volume of that chamber varying with the position of the piston 4 along the tube 16.

Because of the deformability, and preferably the resilient deformability, of the outer member 18, and because of the close grip between that outer member 18 and the tube 16, an effective seal is produced between the parts 16 and 18 merely by inserting the former into the latter, and that seal will remain inviolate even though the assembly is subjected to wide variations in temperature, the outer member 18 accommodating itself to any changes in dimension of the tube 16.

In order to facilitate properly locating the tube 16 within the outer member 18 the latter may be interiorly provided with a shoulder 30 located near, and preferably spaced somewhat above, the end wall portion 24, the lower end 8' of the cylinder 16 being adapted to rest on that shoulder 30 when the parts are assembled.

In order to provide means for facilitating the mounting of the dashpot on an external supporting member, such as the panel-board 32 fragmentarily shown in the drawings, the end wall portion 24 of the outer member 18 may be provided with a downwardly extending portion 34 of a size and shape such as to be received within an opening 36 in the panelboard 32.

The downwardly extending mounting portion 34 is utilized, in conjunction with an adjustable positionable valve element generally designated 38, to constitute an adjustable valve communicating between the chamber 28 and the exterior of the assembly. To that end an aperture 40 is formed through the portion 34, opening at its top into the chamber 28 and opening at its bottom at the external surface of the portion 34. The upper section 40a of the aperture 40 is smooth sided, while the lower section 40b thereof is somewhat wider in diameter than the section 40a and is provided with an internal thread. One or more grooves 42 are formed in the wall defining the aperture section 40b, those grooves 42 interrupting the internal threads, as may clearly be seen in FIG. 2. The upper ends of the grooves 42 communicate with radially inwardly tapered groove sections 42a which extend up into the aperture section 40a and terminate below the upper end thereof.

The movable valve element 38 is formed of a material having substantially the same temperature coefficient of expansion as the material of which the sheath 18 is formed, and preferably of the same material as that of the sheath 18. It comprises a bottom wide portion 44, an intermediate portion 46, and an upper portion 48. The outer portion 44 is designed to be accessible for manual adjustment purposes and it therefore is preferably wider than the aperture section 40b and has an appropriately configured outer surface which, as here specifically shown, is polygonal in shape. The intermediate section 46 is designed to fit into the aperture section 40b, and is provided with an external thread designed to mate with the internal thread on the inner surface of the aperture section 40b. In view of the fact that one or both of the thread sections are formed of resiliently compressible material, the threads need not be formed with any great degree of precision, but the threaded elements will nevertheless firmly grasp one another, thereby reliably to hold the parts in adjusted positions. The upper section 48 is smooth-sided and is shaped to fit within the aperture section 40a with an interference fit thereby providing an effective seal between the outer surface of the element section 48 and the inner surface of the aperture section 40a without unduly inhibiting the adjustable positioning of the element section 48 within the aperture section 40a.

Figure 5:
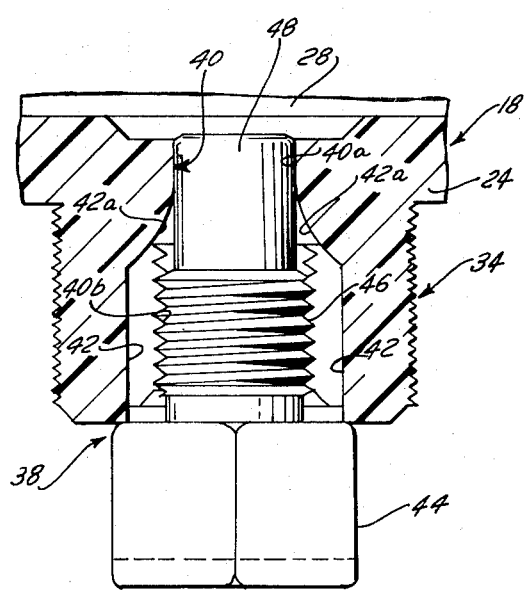
Figure 7:
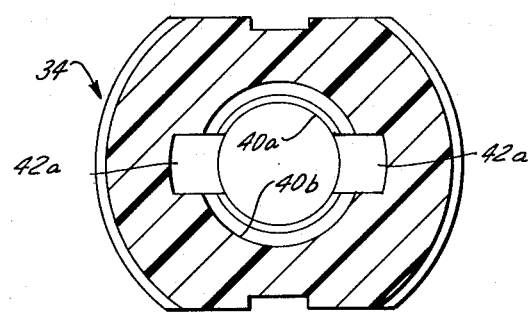
Figure 8:
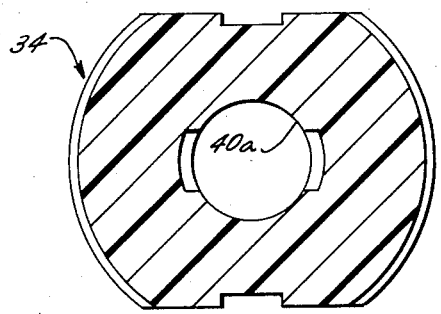
Figure 10:
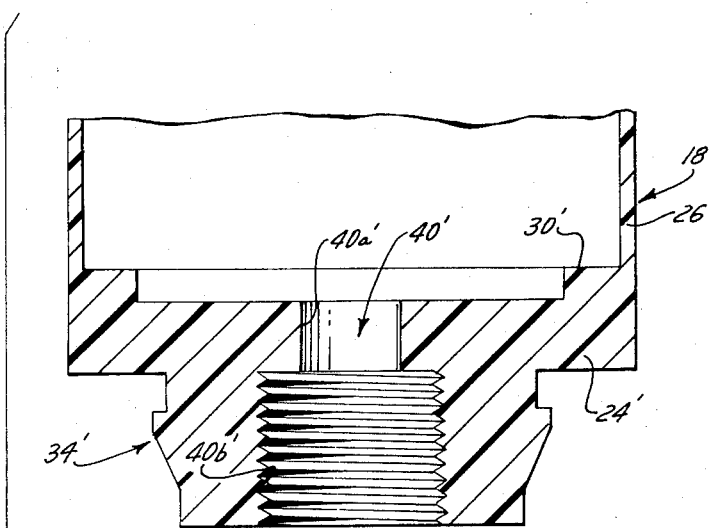
FIG. 10 is a fragmentary vertical cross sectional exploded view on an enlarged scale of the bottom portion of the sheath and of the movable valve member of the embodiment of FIG. 9.

FIGS. 3, 4 and 5 illustrate different positions of the movable valve element 38 relative to the sheath mounting portion 34 to provide different degrees of damping to the dashpot assembly. In FIG. 3 the movable element 38 is shown in a withdrawn position, in FIG. 5 it is shown in its fully inserted position and in FIG. 4 it is shown in an intermediate position. In all of these positions the externally threaded section 36 of the movable element 38 is in threaded engagement with the internally threaded section 40b of the aperture 40. When the movable element 38 is in its fully inserted position shown in FIG. 6, to which position it is moved by threading the movable element 38 into the aperture 40, the upper section 48 is received within the upper aperture 40a to a position above the upper end of the tapered slot portions 42a. By reason of the interference fit between the parts and the resilient engagement of those parts an effective seal is provided between them, as a result of which no fluid passes therebetween and hence the dashpot chamber 28 is sealed off.

When the movable element 38 is screwed out to the withdrawn position shown in FIG. 3 the upper portion of the section 48 is still received within the aperture section 40a, but the tapered slots 42a are exposed. A fluid passage is thus provided from the dashpot chamber 28 through the aperture section 40a and the slots 42a and 42 to the exterior of the assembly. The freedom with which fluid will flow through that path is limited by the spacing between the upper tip of the section 48 and the adjacent walls of the slots 42a. In the position shown in FIG. 3 this spacing is appreciable, fluid flow therethrough will be inhibited only minimally, and hence the dashpot will be damped only minimally.

If a greater degree of damping is desired the movable element 38 is screwed in from its position shown in FIG. 3 to its position shown in FIG. 4. In that latter position the spacing between the tip of section 48 and the walls of slots 42a is much less than was the case in FIG. 3, thereby producing the increased damping effect.

If less damping is desired than is provided by the setting of FIG. 3, then the movable element 38 will be backed off causing the tip of the section 48 to move down, thus increasing the spacing between the tip and the walls of the slots 42a. When the movable element 38 is backed off sufficiently so that the section 48 is completely removed from the aperture section 40a, then maximum fluid passage opening, and hence minimum damping effect, will be achieved.

It will be appreciated that the parts may all be very readily formed, substantially completely by molding operations and with only minimal machining operations being required, with the machining operations being performed on relatively soft material and with only minimal requirements of precision. Nevertheless, because of the nature of the materials utilized effective seals and effective threaded engagement will be accomplished reliably and accurately, with the movable part being readily held in adjusted position while still being readily manually movable where that is desired, and with the damping effect produced being substantially insensitive to temperature variations.

It is preferred that the material of which the sheath 18 and movable valve element 38 is formed be of a high durometer elastic material such as urethane rubber.

In the embodiment of FIGS. 1–8, the tapered or nonlinear surfaces (the surfaces defining the slots section 42a) are formed in the sheath part 34. This may be done without too much difficulty in relatively large assemblies, but is quite difficult to accomplish in small assemblies. Moreover, adjustment of the degree of damping provided is rather sensitive at the high damping end of the spectrum. The embodiment of FIGS. 9–16 eliminates these problems. In that embodiment the non-linear or tapered surfaces are formed in the movable valve element, and the design of those surfaces is such that better control of the precise degree of damping provided at the high damping end of the spectrum is achieved. In addition, in the embodiment of FIGS. 9–16 the sheath itself is modified so as to more reliably retain the cylinder therewithin, and, where desired, so as to prevent undesired removal of the piston from the cylinder. (Both of these features could, if desired, be incorporated into the embodiment of FIGS. 1–8) In describing the embodiment of FIGS. 9–16, where there are parts comparable to those in the previously described embodiment similar reference manuals will be used, differentiated, however, by being primed.

Figure 9:
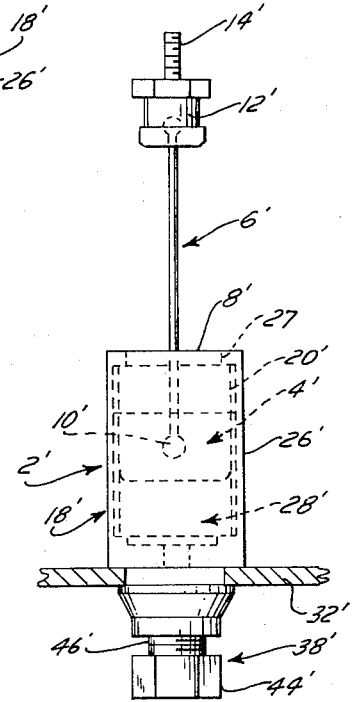
FIG. 9 is a side elevational view of a second embodiment of the present invention.
Figure 12:
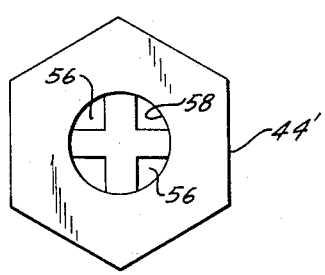
FIG. 12 is a bottom plan view thereof.
Figure 11:
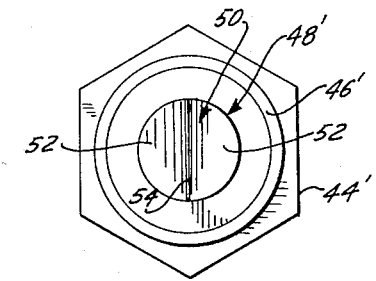
FIG. 11 is a top plan view of the adjustable valve member.

Referring first to FIG. 9, it will be noted that the cylinder portion 26' of the sheath extends the full length, and is provided at its upper end with a radially inwardly extending lip 27 which extends over the upper end, of the cylinder 16', thereby more reliably retaining the cylinder 16' within the sheath 18'. Moreover, that lip 27 may extend radially inwardly beyond the inner surface 20' of the cylinder 16', and hence into the path movement of the piston 4', the lip 27 then constituting means serving to inhibit accidental removal of the piston 4' from the cylinder 16'.

In the embodiment here under discussion the aperture sections 40a' and 40b' are similar to the corresponding aperture sections in the earlier described embodiment except that the grooves 42 and 42a are omitted. It is convenient for the aperture section 40b' to be somewhat greater in diameter relative to the section 48' than was the case with aperture sections 40b and 40a of the earlier described embodiment.

The movable valve element 38' in the present embodiment comprises sections 44', 46' and 48'. The sections 44' and 46' are essentially the same as corresponding sections 44 and 46 of element 38 of the first described embodiment. The upper section 48' of the movable valve element 38', is, however, significantly different from the upper section 48 of the movable element 38. The section 48' has a cylindrical outer surface which is designed to make an interference fit within the aperture section 48'. The upper tip of the section 48', however, is provided with an inwardly and downwardly tapered notch 50 defined by side walls 52 meeting at a vertex 54, which vertex 54 comprises a line inclined somewhat with respect to the axis of the section 48', as may best be seen from FIGS. 13–16. The section 48' is also provided, at points spaced beneath the vertex line 54, with inwardly extending fluid passage openings 56 which communicate with a bore passage 58 extending through the sections 46' and 44'.

Figure 13:
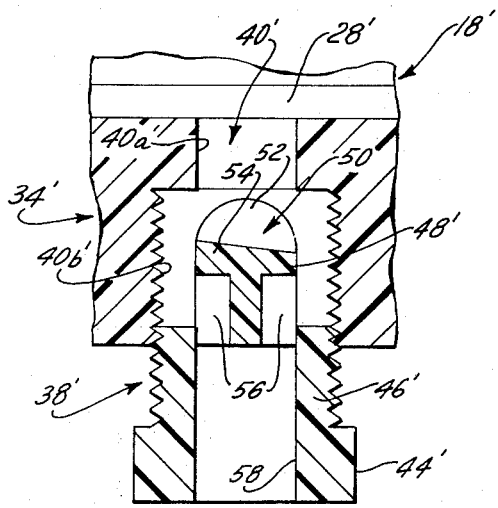
FIGS. 13–16 are cross sectional views of the valve of the embodiment of FIG. 9 showing the adjustable valve member in different positions of adjustment.

The manner in which the valve functions will be apparent from a comparison of FIGS. 13–16. In FIG. 13 the element 38' is illustrated in a withdrawn position in which fluid can freely flow from the dashpot chamber 28' through aperture section 49a' into aperture section 40b', around the upper portion of section 48' and then through the passages 56 and 58 to the exterior of the assembly. No substantial damping will be produced with the valve element 38' in this position.

Figure 14:
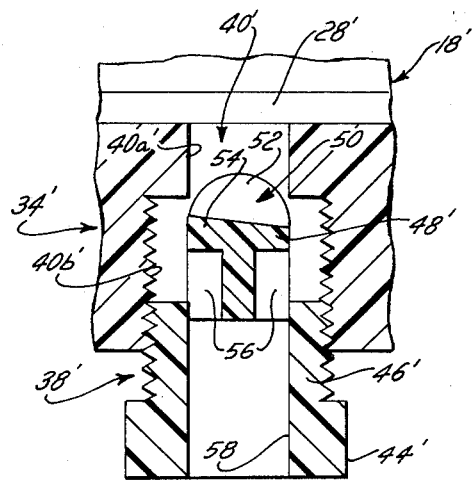

If a moderate degree of damping is desired the element 38' is screwed into the position shown in FIG. 14 in which the fluid escaping from the dashpot chamber 28' will now have to pass through the somewhat restricted spaces defined between the notched tip 50 of the section 48' and the spaces in the aperture section 40b' surrounding the section 48', the tapering side walls 52 of the notch 50 also serving to restrict the fluid flow path. Because of the inclined nature of the vertex line 54 more damping will be provided on the left-hand side of the movable element than on the right-hand side thereof, as viewed in FIG. 14, and the resultant degree of damping will represent the combinative effect of the two gaps.

Figure 15:
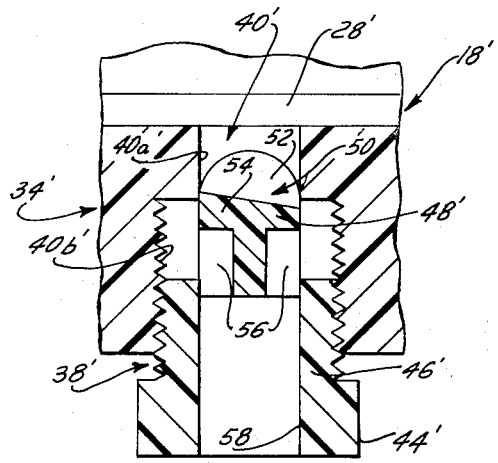
Figure 16:
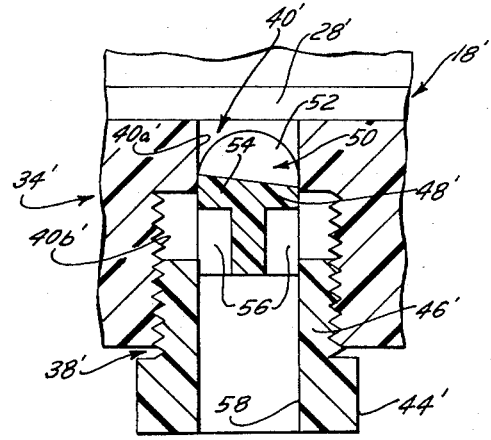

When a much higher degree of damping is desired the valve element 38' is screwed into its position shown in FIG. 15. In this position the upper end of the vertex line 54 is within the aperture section 40a' while the lower end thereof is within the aperture section 40b'. Hence fluid can flow only through the single gap shown at the right-hand side of FIG. 15, and because of the tapered nature of the walls 52 the space through which the fluid can flow is further restricted and controlled, these walls being spaced further from one another as one moves up from the vertex line 54. Because of the inclined nature of that vertex line 54 a much finer control of the degree of damping at the high damping end of the spectrum is thus produced.

When the dashpot chamber 28 is to be completely closed off the element 38' is screwed into its position shown in FIG. 15, in which both ends of the vertex line 54 are received within the aperture section 40a'. With the element 38' in this position, and because of the interference fit between the section 48' and the aperture section 40a', an effective seal is produced and no fluid is permitted to flow therethrough.

It will be understood that the various positions of the movable valve elements here discussed are exemplary only, and that the valve constructions in question will provide for effective continuous fine control of the degree of damping from a substantially undamped condition to a sealed or completely damped condition.

It will be appreciated from the above that the structures in question may be readily and expensively manufactured, that the damping control is precise, reliable, and substantially insensitive to variations in change of temperature, and that by using the sheath, thereby achieving the advantages attendant upon that type of construction, the incorporation of the adjustment valve into the overall assembly is greatly facilitated both from an assembly and an expense point of view.

While but a limited number of embodiments of the present invention have been here specifically disclosed it will be apparent that many variations may be made therein, all within the scope of my invention as defined in the following claims.

I claim:

1. A dashpot cylinder assembly comprising a generally cylindrical side wall formed of rigid material defining a space within which a piston is adapted to slide in sealing relationship with said side wall, a bottom wall formed of resilient material having an upwardly extending flange within which said side wall is sealingly received, said bottom wall closing the bottom of said space, said bottom wall having an aperture therethrough comprising a first section in communication with said space and a second section communicating with the exterior of said assembly, and an adjustment member having a first section sealingly slidably received in said first aperture section, having a second section received in said second aperture section, and being axially adjustably positionable in said aperture, one of (a) the inner surface of said first aperture section and (b) the outer surface of said first adjustment member section having a passage formed therein which communicates with the exterior of said assembly and which extends toward and is tapered down toward said space, and engageable means on said adjustment member and said bottom wall for retaining said adjustment member in its axially adjusted position in said aperture, thereby to define an adjustable vent for said space.

2. The assembly of claim 1, in which said flange on said bottom wall has a lip which extends over the upper edge of said side wall, thereby to axially retain said side wall and said bottom wall in assembled relationship.

3. The assembly of claim 1, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

4. The assembly of claim 1, in which said adjustment member is formed of resilient material having substantially the same temperature coefficient of expansion as said bottom wall.

5. The assembly of claim 4, in which said flange on said bottom wall has a lip which extends over the upper edge of said side wall, thereby to axially retain said side wall and said bottom wall in assembled relationship.

6. The assembly of claim 4, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

7. The assembly of claim 1, in which said bottom wall is provided with a downwardly projecting portion through which said aperture extends, the exterior of said projecting portion being provided with means for mounting said assembly on a support.

8. The assembly of claim 7, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

9. The assembly of claim 7, in which said adjustment member is formed of resilient material having substantially the same temperature coefficient of expansion as said bottom wall.

10. The assembly of claim 9, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

11. The assembly of claim 1, in which said passage is formed on the inner surface of said first aperture section and comprises a slot extending from and tapering outwardly in depth from a point spaced below the upper end to the lower end of said first aperture section, there being a space between said second aperture section and said adjustment member which extends and communicates between said slot and the exterior of said bottom wall.

12. The assembly of claim 11, in which said adjustment member is formed of resilient material having substantially the same temperature coefficient of expansion as said bottom wall.

13. The assembly of claim 11, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

14. The assembly of claim 11, in which a pair of said slots are thus formed the upper ends of which are differently spaced below the upper end of said first aperture section.

15. The assembly of claim 14, in which said adjustment member is formed of resilient material having substantially the same temperature coefficient of expansion as said bottom wall.

16. The assembly of claim 14, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

17. The assembly of claim 1, in which said passage is formed at least in part in the outer surface of said first adjustment member section and comprises a slot open at its top, extending at least partway across the tip of said first adjustment member section and narrowly tapering in width from the upper end toward the lower end thereof.

18. The assembly of claim 17, in which said adjustment member is formed of resilient material having substantially the same temperature coefficient of expansion as said bottom wall.

19. The assembly of claim 17, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

20. The assembly of claim 17, in which the lower surface of said slot makes an angle other than 90° with the axis of said first adjustment member section.

21. The assembly of claim 20, in which said adjustment member is provided with a passage section communicating between the lower end of said member and the second surface of said member at a point spaced below the lower end of said slot, thereby to define, with an upper portion of said second aperture section, a fluid flow path from said slot, when the latter is exposed to said second aperture section, to the exterior of said assembly.

22. The assembly of claim 17, in which said adjustment member is provided with a passage section communicating between the lower end of said member and the second surface of said member at a point spaced below the lower end of said slot, thereby to define, with an upper portion of said second aperture section, a fluid flow path from said slot, when the latter is exposed to said second aperture section, to the exterior of said assembly.

23. The assembly of claim 22, in which said adjustment member is formed of resilient material having substantially the same temperature coefficient of expansion as said bottom wall.

24. The assembly of claim 22, in which said flange on said bottom wall has a lip which extends over the upper edge of said side wall, thereby to axially retain said side wall and said bottom wall in assembled relationship, said lip extending radially inwardly over a portion of the upper end of said space, thereby to retain a piston in said space.

* * * * *